United States Patent
Friedl et al.

(10) Patent No.: US 9,172,546 B2
(45) Date of Patent: Oct. 27, 2015

(54) NETWORK MEDIATED MULTI-DEVICE SHARED AUTHENTICATION

(75) Inventors: Stephan Edward Friedl, Frederick, CO (US); Thomas Martin Wesselman, Issaquah, WA (US); Steven Chervets, Longmont, CO (US)

(73) Assignee: Cisco Technology, Inc., San Jose, CA (US)

( * ) Notice: Subject to any disclaimer, the term of this patent is extended or adjusted under 35 U.S.C. 154(b) by 790 days.

(21) Appl. No.: 13/358,079

(22) Filed: Jan. 25, 2012

(65) Prior Publication Data
US 2013/0191902 A1 Jul. 25, 2013

(51) Int. Cl.
| | |
|---|---|
| *G06F 21/41* | (2013.01) |
| *H04L 9/32* | (2006.01) |
| *H04W 12/06* | (2009.01) |
| *G06F 21/35* | (2013.01) |
| *H04W 4/00* | (2009.01) |

(52) U.S. Cl.
CPC .............. *H04L 9/3271* (2013.01); *G06F 21/35* (2013.01); *G06F 21/41* (2013.01); *H04W 12/06* (2013.01); *H04L 2209/805* (2013.01); *H04W 4/008* (2013.01)

(58) Field of Classification Search
CPC ... H04L 9/32; H04L 2209/805; H04L 9/3271; G06F 21/00; G06F 21/35; G06F 21/41; H04W 12/06; H04W 4/008
See application file for complete search history.

(56) References Cited

U.S. PATENT DOCUMENTS

| | | | |
|---|---|---|---|
| 5,898,831 A * | 4/1999 | Hall et al. .......................... 726/3 |
| 6,871,224 B1 | 3/2005 | Chu et al. | |
| 7,231,526 B2 * | 6/2007 | Hon et al. ...................... 713/185 |
| 7,562,224 B2 | 7/2009 | Krischer et al. | |
| 7,603,556 B2 * | 10/2009 | Brown et al. .................. 713/169 |
| 7,620,978 B1 * | 11/2009 | Reddy et al. ...................... 726/8 |
| 7,631,347 B2 | 12/2009 | Cam-Winget et al. | |
| 7,694,335 B1 * | 4/2010 | Turner et al. .................... 726/14 |
| 7,761,549 B2 | 7/2010 | Farnham et al. | |

(Continued)

FOREIGN PATENT DOCUMENTS

WO  WO 2011/075825  6/2011

OTHER PUBLICATIONS

International Search Report and the Written Opinion of the International Searching Authority for PCT/US2013/023123 dated Apr. 2, 2013.

*Primary Examiner* — Jung Kim
*Assistant Examiner* — James J Wilcox
(74) *Attorney, Agent, or Firm* — Patterson & Sheridan, LLP (57) ABSTRACT

Described in an example embodiment herein is an apparatus, comprising a communication interface and authentication logic coupled with the wireless interface. The authentication logic authenticates with at least one neighboring device forming a trust relationship with the at least one neighboring device. The authentication logic obtains via the communication interface data representative of a user associated with a user device. The authentication logic sends a challenge to the user device, via the communication interface, the challenge requesting data associated with the user associated with the user device. The authentication logic receives a response to the challenge via the user interface and validates the response to the challenge. The authentication logic provides data to the at least one neighboring device indicating that the user associated with the user device has been authenticated, to enable access to the functionality and/or resources of the at least one neighboring device.

16 Claims, 4 Drawing Sheets

(56) References Cited

U.S. PATENT DOCUMENTS

| | | |
|---|---|---|
| 7,788,704 B2 | 8/2010 | O'Toole |
| 8,074,070 B2 | 12/2011 | Rebo et al. |
| 8,086,853 B2* | 12/2011 | Warwick ............... 713/168 |
| 8,356,333 B2* | 1/2013 | Kramer ..................... 726/2 |
| 8,375,207 B2* | 2/2013 | Dangoor et al. ......... 713/168 |
| 8,868,918 B2* | 10/2014 | Jaquet-Chiffelle ....... 713/182 |
| 2003/0009537 A1* | 1/2003 | Wang ...................... 709/219 |
| 2003/0064711 A1 | 4/2003 | Gilbert |
| 2005/0268107 A1* | 12/2005 | Harris et al. ............. 713/182 |
| 2007/0109989 A1* | 5/2007 | Nakagawa et al. ....... 370/328 |
| 2008/0098464 A1* | 4/2008 | Mizrah ....................... 726/5 |
| 2009/0178124 A1* | 7/2009 | Manion et al. ............. 726/6 |
| 2010/0080372 A1* | 4/2010 | Mahone et al. ......... 379/114.14 |
| 2010/0278345 A1 | 11/2010 | Alsina |
| 2011/0145900 A1* | 6/2011 | Chern ......................... 726/7 |
| 2011/0238751 A1* | 9/2011 | Belimpasakis et al. .... 709/204 |
| 2013/0291071 A1* | 10/2013 | Blom et al. ................. 726/4 |

\* cited by examiner

NETWORK MEDIATED MULTI-DEVICE SHARED AUTHENTICATION

TECHNICAL FIELD

The present disclosure relates generally to user authentication.

BACKGROUND

An individual may have a multiplicity of networked desktop and mobile devices that operate independently of the other devices and require end user authentication. Some of these devices may discover each other through technologies such as BLUETOOTH, but any trust relationships created as a result of these discoveries tend to be peering relationships between the endpoint devices such as a personal area network (PAN). A PAN or peer-to-peer trust establishment can suffer from an n-squared problem where devices participating in a PAN must be knowledgeable of the authentication mechanisms of all other devices that may wish to join the PAN.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus, comprising a communication interface and authentication logic coupled with the wireless interface. The authentication logic authenticates with at least one neighboring device establishing a trust relationship with the at least one neighboring device. The authentication logic obtains, via the communication interface, data representative of a user associated with a user device. The authentication logic sends a challenge to the user device, via the communication interface, the challenge requesting data associated with the user associated with the user device. The authentication logic receives a response to the challenge via the user interface and validates the response to the challenge. The authentication logic provides data to the at least one neighboring device indicating that the user associated with the user device has been authenticated, to enable access to the at least one neighboring device.

In accordance with an example embodiment, there is disclosed herein, an apparatus comprising communication interface and authentication logic coupled with the wireless interface. The authentication logic provides a username of an associated user to a networked device. The authentication logic receives a challenge associated with the username. The authentication logic provides a response to the challenge. The authentication logic determines the user has been authenticated with the networked device and at least one other networked device associated with the networked device.

In accordance with an example embodiment, there is disclosed herein, an apparatus comprising a communication interface and authentication logic coupled with the wireless interface. The authentication logic sends a challenge to authenticate the username via the communication interface in response to receiving a request from a networked device requesting authentication of a username, associated with a user device via the communication interface. The authentication logic verifies a response to the challenge received via the communication interface and authenticates the user device with the networked device sending the response to the challenge and with other networked devices associated with the networked device within a predefined proximity of the networked device.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment described herein a multiplicity of networked devices associated, or not associated, with an individual may discover each other based on proximity (e.g., BLUETOOTH, WIFI, triangulation, and/or by explicit configuration, etc.) and authenticate collectively employing a common network authentication service. The network authentication service may serve as a 'mediator' between devices so that a device with an associated, authenticated user can be used to facilitate authentication of that user with other devices in proximity with the associated, authenticated user. In particular embodiments, the device with the associated, authenticated user can be employed to authenticate the associated, authenticated user with devices that lack a user interface.

An aspect of an example embodiment addresses the n-squared problem associated with personal area network (PAN) style authentication as devices in the PAN can employ the network based mediator service. The network based mediator service can select an appropriate authentication scheme based on the characteristics of the devices in proximity to the user.

For example, an individual user may possess a smartphone or similar type of mobile communication device when they enter their office environment. At the user's work station, the user may have a desk phone, computing device and/or VDI (Virtual Desktop Interface) endpoint. In an example embodiment, the work station devices can identify themselves to the mobile communication device, and the mobile communication device can initiate a network authentication for/with the end user (e.g., the person carrying the mobile communication device) and the work station devices.

In an example embodiment, a challenge phrase can be displayed on devices in proximity with a user (e.g., a VOIP (Voice over Internet Protocol) phone display or a LCD (Liquid Crystal Display) for PC (personal computer) and/or VDI endpoint (and/or optionally on the user interface of the mobile device), and the user associated and authenticated with the mobile device can supply a response to the challenges via the mobile device, which communicates the response to the authentication (mediation) server. Upon successfully authenticating with the mediation server, the mediation server can inform the other devices in proximity with the user that they are now authenticated with the user of the mobile device.

In another example embodiment, a mobile device associated with a user provides devices in proximity with the user with a username. A challenge can be issued from the authentication server to the mobile device. The response to the challenge can be based on a password known to the end user and the response to the challenge can be sent from the mobile device to the devices in proximity with the mobile device. The devices in proximity with the user can send the response to the challenge to the authentication service to authenticate the user.

For example, in a hotel-type setting, a set of devices can be pre-configured as associated with a specific room. A guest can be provided with credentials for the room. When the guest enters the room, the guest can use a smartphone or other mobile computing device that can detect the set of devices associated with the room and perform authentication to access the set of devices associated with the room. In particular embodiments, location data can be employed for authentication/de-authentication. For example, if the set of devices in the room no longer detect the user's smartphone, they can de-authenticate the user. As another example, location servers such as triangulation or WIFI can be employed to determine whether the guest is in proximity of the specific room.

To protect against rogue devices attempting to piggyback on the circle of trust authentication mechanism, a user can be presented with a list of devices requesting access. The user can deny access to any untrusted/unknown devices. Alternatively, the user can employ a white list to protect against rogue attacks. Devices not on the white list will be ignored.

In an example embodiment, a multiplicity of networked devices can be simultaneously associated with an end user as a result of a single response to a challenge sent to only one of those devices. Multiple entries of user names and passwords can be eliminated.

In an example embodiment, the network authentication service could maintain a list of networked devices associated with an end user and provide authentication information to other network services to facilitate the routing of messages and/or other data to the user. For example, if a user leaves their workstation for lunch and is carrying their smartphone or other mobile computing device, workstation devices would de-authenticate the user and the network service can route calls to the user's smartphone or other mobile computing device rather than to the user's desk phone or a softphone associated with a personal computer (PC) at the user's workstation while the user is away from their workstation.

In an example embodiment, a network service that is knowledgeable of the geographic location of users can be employed to provide increased security to a user and an enterprise. For example, if a user is associated with three devices in Boulder. Colo., and a request is received to associate the user with a device in New York City, the network service can generate an alarm and communicate this information to the user and/or with a network security administrator.

In an example embodiment, credentials can be shared across a multiplicity of devices. For example, a user desiring to access an email account (e.g., GMAIL) from their laptop could initiate a query across devices associated with the user. For example, an ANDROID phone associated with the user can respond with the user's GMAIL credentials or a GMAIL cookie which can provide access to the laptops' browser. Credential sharing can be controlled via network policy.

Figure 1:
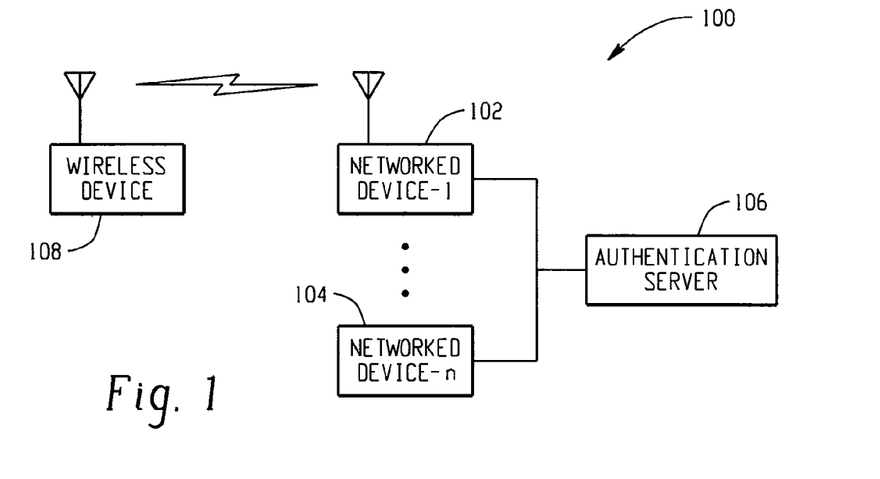
FIG. 1 is a block diagram illustrating an example of network employing network mediated multi-device shared authentication.

FIG. 1 is a block diagram illustrating an example of network 100 employing network mediated multi-device shared authentication. In the illustrated example, network 100 comprises a first networked device, Networked Device-1 102, and a second networked device, Networked Device-n 104, where n is an integer greater than one. Those skilled in the art can readily appreciate that the number of networked devices linked together can be as few as two as illustrated in FIG. 1, or can have as many devices as is physically realizable. The number of networked devices illustrated in FIG. 1 was selected merely for ease of illustration and should not be construed as limiting.

In an example embodiment, one of networked devices 102, 104 authenticates with the other networked device (e.g., network device 102 authenticates networked device 104 or networked device 104 authenticates with networked device 102) establishing a trust relationship. In another example embodiment, networked devices 102, 104 mutually authenticate with each other. Upon establishing a trust relationship, networked devices 102, 104 may form a network such as a personal area network (PAN) or a peer-to-peer network.

In an example embodiment, networked devices 102, 104 may be different types of devices. For example, networked device 102 may be a desktop telephone and networked device 104 may be a desktop computer and/or a VDI computer terminal. As another example, a hotel room may employ a network 100 with three networked devices such as a telephone, television (which can be programmed with a user specified configuration to include and/or exclude certain channels), and digital photo frame which can load a user specified photograph for display.

Optionally, networked devices 102, 104 may be coupled with an authentication server 106. In an example embodiment, authentication server 106 is a standalone device; however, authentication server 106 may be co-located in one of networked devices 102, 104.

A device associated with a user, which in the example illustrated in FIG. 1 is wireless device 108, is employed to authenticate the user associated with the device with networked devices 102, 104. For example, when wireless device 108 is within range of networked device 102, networked device 102 can attempt to authenticate the user associated with the device. Wireless device 108 may provide a username to networked device 102 which can respond by sending a challenge to wireless device 108 requesting a response such as a password or other data associated with a user (for example an employee identification number, hotel room number, or other information specific to the user). In particular, networked device 102 can request a username and password from wireless device 108.

Wireless device 108 obtains a response to the challenge and sends the response to networked device 102. Networked device 102 validates the response. In an example embodiment, networked device 102 employs an authentication server, e.g., authentication server 106, to validate the response. Upon validating the response, networked device 102 provides data to networked device 104 indicating that the user associated with wireless device 108 has been authenticated to enable access to the at least one neighboring device. In an example embodiment, networked device 102 may provide a session key to networked device 104 for communicating with wireless device 108. In another embodiment, authentication server 106 broadcasts a message to other networked devices such as networked device 104 indicating that wireless device 108 is now authenticated. This message could also include authentication information such as credentials or cookies.

In an example embodiment, networked device 102 limits authentication to neighboring devices within a predetermined proximity. In particular embodiments, networked device 102 authenticates with neighboring devices within a predefined bounded area such as within a room or workspace.

In an example embodiment, the data provided by networked device 102 to networked device 104 may include data identifying wireless device 108. For example, the data may include a telephone number associated with wireless device 108. As another example, the data may include a media access control (MAC) address for wireless device 108.

In an example embodiment, networked device 104 may provide authentication data to networked device 102. For example, if wireless device 108 or a second authorized user (not shown) establishes communications with networked device 104, networked device 104 requests a username and issues a challenge (such as requesting a password) associated with the user name. Upon validating the username and a response to the challenge, networked device 104 informs networked device 102 that the user associated with the device communicating with networked device 102 has been authenticated to enable access to networked device 102.

In an example embodiment, access is provided to networked devices 102, 104 as long as wireless device 108 is detected by either networked device 102, networked device 104, and/or both of networked devices 102, 104. Once communications has been lost with wireless device 108 (or lost for more than a predetermined amount of time), the user is de-authenticated and access to networked devices 102, 104 is restricted. For example, if a not authenticated wireless device is detected by networked device 102 and/or networked device 104, networked devices 102, 104 may lock themselves. A user may be able to manually login into networked devices 102, 104 via a user interface if available.

In an example embodiment, upon successfully authenticating with networked device 102, wireless device may receive data indicating that authentication has also been extended to other wireless networked devices, such as networked device 104. In particular embodiments, wireless device 108 may suitably comprise a user interface which will allow a user to determine which devices are attempting to authenticate with wireless device 108. Wireless device 108 may receive a user selection via the user interface and limit authentication to devices designated by the user. In particular embodiments, wireless device 108 may be configured with a list of devices (e.g., a white list) for authentication. Networked devices not on the list can be ignored.

The user interface may also be employed for providing the challenge received from networked device 102 to a user and for receiving data representative of a response to the challenge. In particular embodiments, which employ an authentication server, such as authentication server 106, the response to the challenge can be encrypted with a key known to authentication server 106 that is not known by networked device 102.

In an example embodiment, wireless device may receive a credential from networked device 102 and/or networked device 104 for accessing data or an application. For example, if the user wishes to check an email account (such as GMAIL) using wireless device 108, a credential for accessing the account can be acquired from one of the networked devices 102, 104.

In an example embodiment, networked device 102 or networked device 104 provides wireless device 108 with a uniform resource locator (URL) or IP address of the authentication server 106. Wireless device 108 can authenticate directly with authentication server 106.

In an example embodiment, authentication server 106 can determine which networked devices can be accessed upon authenticating a user associated with wireless device 108. For example, upon authenticating the user associated with wireless device 108 communicating with networked device 102, authentication server 106 can authenticate the user associated with wireless device 108 with devices having a trust relationship with networked device 102. In an example embodiment, authentication of the user associated with wireless device 108 to devices having a trust relationship with networked device 102 can be limited to networked devices within a predefined proximity of the networked device 102.

In an example embodiment, authentication server 106 limits a networked device to data appropriate for that networked device. For example, if networked device 102 is a television and networked device 104 is a telephone, authentication server 106 can prevent telephone data, e.g., call history, contact data, from being provided to network device 102, and similarly, prevent television data, e.g., viewing history, included/excluded channels from being provided to networked device. The authentication server 106 may employ access control lists (ACLS) or push virtual local area network (VLAN) settings.

In an example embodiment, networked devices 102, 104 and/or wireless device 108 can be reconfigured while wireless device 108 is associated with one or more of networked devices 102, 104. Networked devices 102, 104 and/or wireless device 108 can reconfigure themselves or in an example embodiment, authentication server 106 can reconfigure networked device 102, networked device 104 and/or wireless device 108. For example, if networked device 102 is a desk phone (such as at a user's workstation, conference room, or hotel room), calls directed to a telephone number associated with wireless device 108 can be redirected to networked device 102 while wireless device 108 is within proximity of networked device 102. Once wireless device 108 moves away from networked device 102, phone calls to wireless device 108 will once again be routed to wireless device 108.

In an example embodiment, authentication server 106 determines whether the username associated with the wireless device 108 is already logged into a network at a location that is outside of a predefined geographic proximity of networked device 102. For example, if the user is already logged in at a location several miles away, or in another city, authentication server 106 can take corrective action. The corrective action can be any predefined action, including but not limited to, denying access to the user associated with wireless device 108, locking out the user's account, notifying a network administrator, generating a log entry or a combination of predefined actions.

Figure 2:
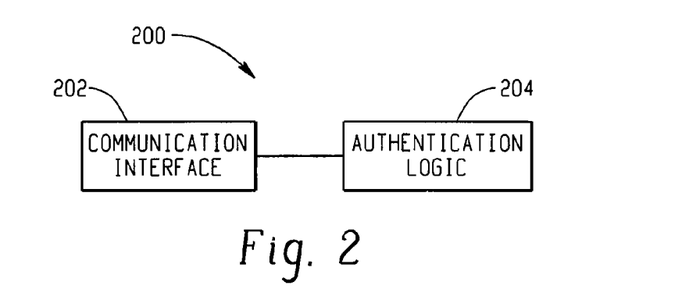
FIG. 2 is a block diagram of a networked device capable of providing network mediated multi-device shared authentication.

FIG. 2 is a block diagram of a networked device 200 capable of providing network mediated multi-device shared authentication. Networked device 200 is suitably adaptable for performing the functionality of networked device-1 102 and/or networked device-n 104 in FIG. 1.

Networked device 200 comprises a communication interface 202. Communication interface 202 enables networked device 200 to communicate with external devices. Communication interface 202 may be a wireless or wired interface. For example, communication interface 202 may be a local area network (LAN) card to provide a data communication connection to a compatible LAN. As another example, communication interface 202 may be an integrated services digital network (ISDN) card or a modem to provide a data communication connection to a corresponding type of telephone line. Wireless links may also be implemented. In any such implementation, communication interface 202 sends and receives electrical, electromagnetic, or optical signals that carry digital data streams representing various types of information. For example, communication interface 202 may allow networked device 102 (FIG. 1) to communicate with networked device 104 (FIG. 1), authentication server 106 (FIG. 1) and/or wireless device 108. In an example embodiment, networked device 200 may suitably comprise a plurality of communication interfaces 202. For example, a first communication interface 202 may be employed by networked device 102 (FIG. 1) to communicate with networked device 104 (FIG. 1) and/or authentication server 106 (FIG. 1) and a second communication interface 202 may be employed to communicate with wireless device 108 (FIG. 1).

Networked device 200 further comprises authentication logic 204 coupled with the communication interface 202. Authentication logic 204 employs communication interface 202 for communicating with external devices. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, the authentication logic 204 authenticates with at least one neighboring device via communication interface 202 establishing a trust relationship with the at least one neighboring device. Once the trust relationship is established, authentication logic 204 can form a network such as a peer-to-peer (P2P) network or personal area network (PAN) with the at least one neighboring device.

In an example embodiment, the authentication logic 204 obtains via the communication interface 202 data representative of a user associated with a user device. The authentication logic 204 sends a challenge to the user device via the communication interface 202, the challenge requests data associated with the user associated with the user device. For example, the challenge may request a password or other information associated with the user. The authentication logic 204 receives a response to the challenge via the communication interface 202. The authentication logic 204 validates the response to the challenge and provides data to the at least one neighboring device indicating that the user associated with the user device has been authenticated to enable access to the at least one neighboring device.

In an example embodiment, the authentication logic 204 authenticates with neighboring devices within a predetermined proximity. For example, the authentication logic 204 may authenticate with neighboring devices within a predefined bounded area such as a work area, room, office or other predefined geographical area.

In an example embodiment, the authentication logic 204 employs an authentication server (not shown, see e.g., authentication server 106 in FIG. 1) for authenticating user devices. In particular embodiments, the authentication logic 204 also functions as an authentication server and authenticates user devices.

In an example embodiment, upon authenticating a user device, the authentication logic provides a data representative of a session key to neighboring devices that networked device 200 that have an established a trust relationship with networked device 200. In particular embodiments the distribution of the data representative of a session key is limited to devices within a predefined proximity or bounded area, such as a workspace or room (e.g., a conference room or a hotel room).

In an example embodiment, upon authenticating a user device, the authentication logic 204 provides data identifying the user device to neighboring devices that have an established a trust relationship with networked device 200. For example, the data identifying the user device may be a telephone number and/or a media access control (MAC) address associated with the user device.

In an example embodiment, the authentication logic 204 receives data representative of an authenticated user from and/or user device from a neighboring device having a trust relationship with networked device 200 via communication interface 202. Because of the established trust relationship, the authenticated user and/or user is allowed access based on the data received from the neighboring device.

The user may be allowed access while the authenticated user device associated with the user is in communication with communication interface 202. In particular embodiments, a shared device may be employed to determine whether the authenticated user device is within a predefined proximity. In embodiments employing a shared device, the shared device will inform the authentication logic 204 when to allow access and when to deny access.

For example, a work space may comprise a computer (which may employ VDI for allowing user access to a network) that has a wireless interface that can detect a wireless device associated with a user and a desk telephone that does not have a wireless interface that can detect the wireless device associated with the user. The computer can authenticate the user device associated with the user and provide data representative of the authenticated user to the telephone. The user can remain authenticated with the telephone as long as the computer's wireless interface can detect the authenticated user device. If communication with the authenticated user device is lost, the computer can de-authenticate the user and/or user device with the telephone.

As another example, a workspace comprising a computer and a telephone may employ a shared wireless device, such as an access point (AP) that has a trust relationship with the computer and telephone to authenticate a user with the computer and telephone. When the user is in the workspace area, the shared wireless device attempts to authenticate the user via a wireless device associated with the user. Upon authenticating the user, the shared wireless device provides data representative of the user to the computer and telephone. The data may include data associated with the user (e.g., a desktop configuration for the computer and/or a contact list for the telephone) or the computer and desktop telephone may obtain this data themselves. When the user leaves the workspace area, the shared wireless device de-authenticates the user with the computer and desktop telephone.

Figure 3:
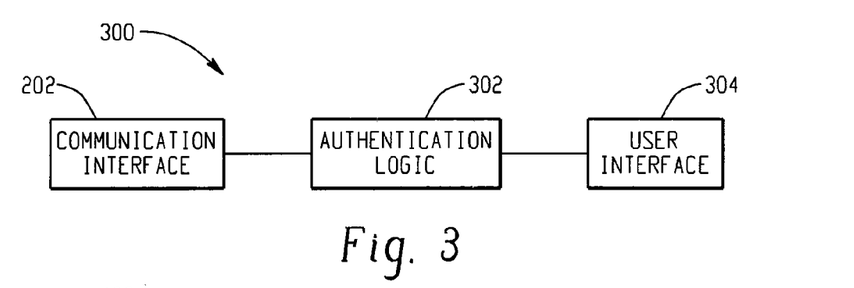
FIG. 3 is a block diagram of a mobile user device employing a user interface upon which an example embodiment can be implemented.

FIG. 3 is a block diagram of a mobile user device 300 employing a user interface upon which an example embodiment can be implemented. In an example embodiment, mobile user device 300 is suitable for implementing the functionality of wireless device 108 in FIG. 1. Mobile user device 300 comprises a communication interface 202 that enables mobile user device to communicate with external devices and authentication logic 302 coupled with communication interface 202 that can send and receive data via communication interface 202.

In an example embodiment, the authentication logic 302 provides a username of an associated user to a networked device. The authentication logic 302 may provide the username in response to a request received via communication interface 202 from the networked device and/or may broadcast the username of the associated user.

The authentication logic 302 receives a challenge associated with the username. The challenge may be a password or some other information associated with the user. The authentication logic 302 provides a response to the challenge. The authentication logic 302 determines the user has been authenticated with the networked device and at least one other networked device associated with the networked device. For example, if the user is entering a workspace, the user may authenticate with a computer at the workspace, and upon authenticating determine that the user is also authenticated with other devices associated with the workspace such as a desktop telephone, and/or a peripheral associated with the computer such as a multifunction peripheral (e.g., printer, scanner, and/or fax), etc. The authentication logic 302 may suitably comprise data indicating what devices are associated with the computer, or may receive data from the computer indicating what other devices the user has also been authenticated.

In an example embodiment, the mobile user device 300 comprises a user interface 304. The user interface may suitably comprise video, audio, and tactile components such as a display, speaker, and/or touch screen. The authentication logic 302 provides the challenge to the user interface, which outputs the challenge. The authentication logic 302 receives the response to the challenge via the user interface 304.

In an example embodiment, a user may select devices for authentication. For example, the authentication logic 302 may determine other networked devices associated with the networked device that are requesting authentication. For example, upon authenticating with a computer at a workstation, a peripheral, desk telephone, projector in a nearby conference room, or even desktop computers at nearby workspaces may also request authentication. The authentication logic 302 may provide data representative of the other networked devices associated with the networked device requesting authentication to the user interface 304. The authentication logic 302 receives data representative of a user selection from the user interface 304 indicating which of the other networked devices associated with the networked device should be authenticated. The authentication logic 302 limits authentication to devices that the data representative of a user selection indicates are allowed to be authenticated.

In an example embodiment, the response to the challenge is encrypted using an encryption key associated with an authentication server associated with the networked device. For example, referring to FIG. 1, the wireless mobile device 108 may send a response to the challenge encrypted with a key known to authentication server 106 but not networked device 102 and/or 104.

In an example embodiment, the authentication logic 302 obtains a credential for accessing data from one the networked device and/or at least one other networked device associated with the networked device. In particular embodiments, the same credential may be used for the networked device and the at least one other device associated with the networked device, while in another example embodiment, different credentials may be employed for accessing the networked device and other devices associated with the networked devices (e.g., a first credential to access a desktop computer and a second credential to access a desktop telephone).

Figure 4:
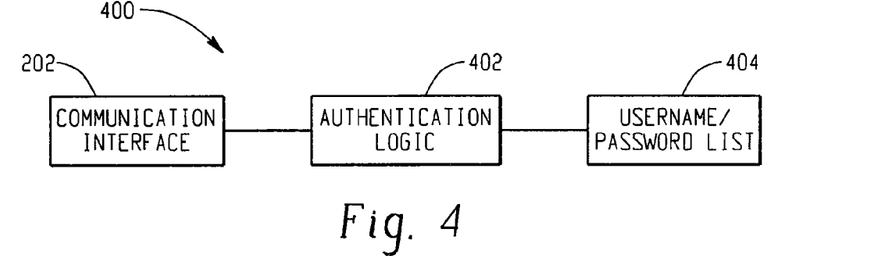
FIG. 4 is a block diagram of an authentication server upon which an example embodiment can be implemented.

FIG. 4 is a block diagram of an authentication server 400 upon which an example embodiment can be implemented. The configuration of authentication server 400 is suitable for implementing the functionality of authentication server 106 described in FIG. 1 herein.

Authentication server 400 comprises a communication interface 202 for communicating with external devices and authentication logic 402 coupled with communication interface 202 and operable to send and receive data via communication interface 202. In particular embodiments, a username/password list 404 is employed by authentication logic 402 for performing authentication.

In an example embodiment, the authentication logic 402 sends a challenge to authenticate the username via the communication interface 202 in response to receiving a request from a networked device requesting authentication of a username associated with a user device via the communication interface 202. The authentication logic 402 verifies a response to the challenge received via the communication interface 202. The authentication logic 402 may employ the username/password list 404 for verifying the response to the challenge. Upon authenticating the user device (and/or user associated with the device), the authentication logic authenticates the user device (and/or user associated with the device) with the networked device that responded to the challenge and with other networked devices associated with the networked device within a predefined proximity of the networked device. For example, in a workplace environment, the authentication server may authenticate the user device (and/or user) with a desktop computer, desk phone, and any peripherals associated with the workspace. In a conference hotel room, the user (and/or user device) may be authenticated with a network service provided by the hotel, the television in the room, desktop telephone in the room, and/or any other devices in the room.

In an example embodiment, the authentication logic 402 limits access of the user device to data appropriate for a networked device that the user device is requesting data therefrom. For example, a television in the user's hotel room would be limited to accessing data associated with the user's viewing habits such as channels to be included/excluded, prerecorded events, etc. As another example, the user's desk telephone would be limited to accessing the user's contacts and would not receive emails, calendar data, etc.

In an example embodiment, authentication logic 402 reconfigures any one or combination of devices associated with the user, the networked device the user is associated with, and/or other devices associated with the networked device. For example, while the user is associated with a workspace, authentication logic 402 can reconfigure the user device to route telephone calls to/from the desktop telephone at the workspace.

In an example embodiment, the authentication logic 402 is further operable to determine whether the username associated with the user device is already logged into a network at a location that is outside of a predefined geographic proximity, and optionally, take corrective action. For example, if a user is logging in from Boulder, Colo. and authentication logic 402 determines that the user is already logged in from a location in New York City, authentication logic 402 may take corrective action including but not limited to locking or otherwise limiting access to the user's account, notifying a network administrator, and/or logging the event.

Figure 5:
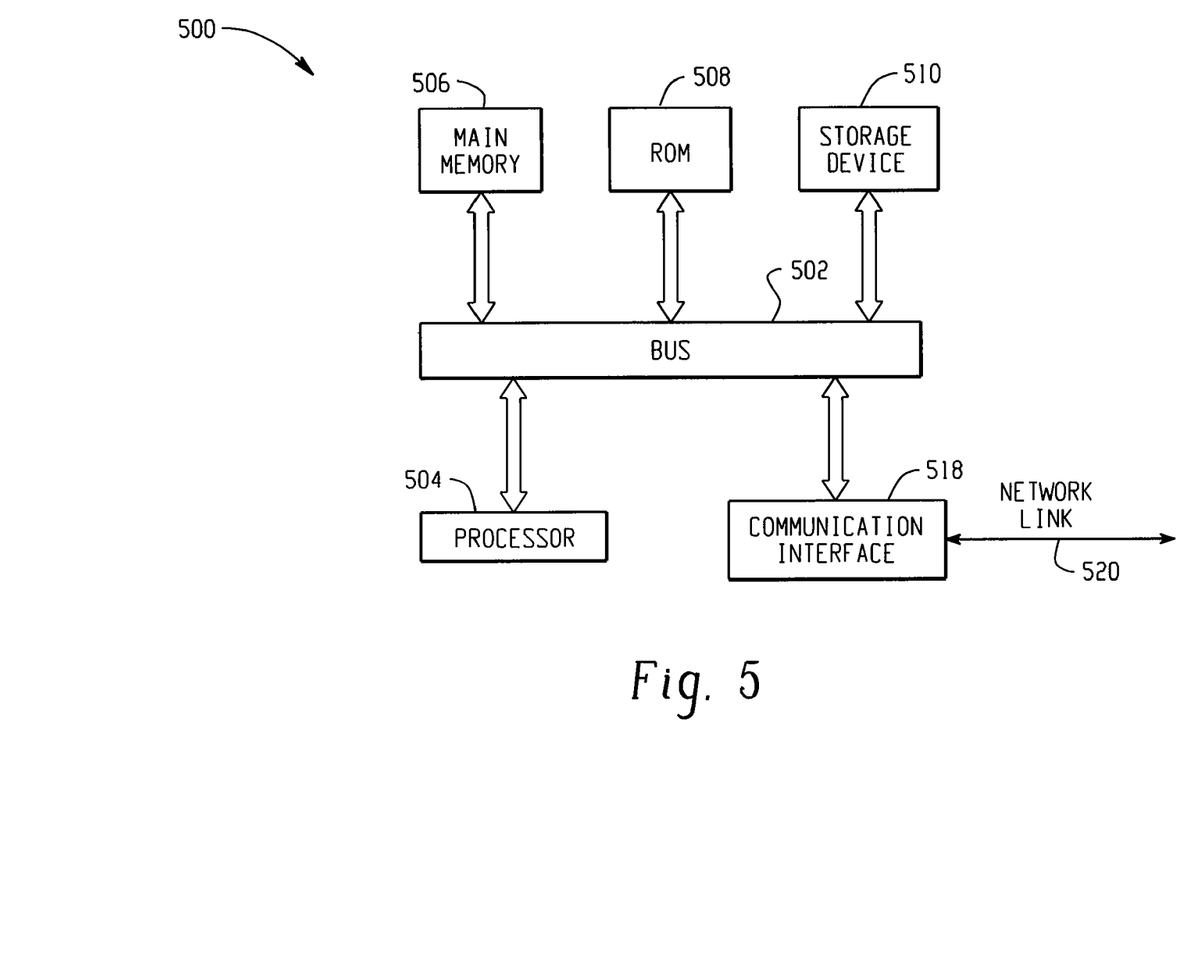
FIG. 5 is a block diagram of a computer system upon which an example embodiment may be implemented.

FIG. 5 is a block diagram of a computer system upon which an example embodiment may be implemented. Computer system 500 is suitable for implementing the functionality described herein for networked devices 102, 104 and authentication server 106 (FIG. 1), authentication logic 204 (FIG. 2), authentication logic 302 (FIG. 3), authentication logic 402 (FIG. 4) and/or Username/Password list 404 (FIG. 4).

Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, optical disk, and/or flash storage, is provided and coupled to bus 502 for storing information and instructions.

An aspect of the example embodiment is related to the use of computer system 500 for network mediated multi-device shared authentication. According to an example embodiment, network mediated multi-device shared authentication is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media, and volatile media. Non-volatile media include, for example, optical or magnetic disks, such as storage device 510. Volatile media include dynamic memory such as main memory 506. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 500 also includes a communication interface 518 coupled to bus 502. Communication interface 518 provides a two-way data communication coupling computer system 500 to a network link 520 that allows computer system 500 to communicate with external devices. For example, communication interface 518 may be a local area network (LAN) card to provide a data communication connection to a compatible LAN. As another example, communication interface 518 may be an integrated services digital network (ISDN) card or a modem to provide a data communication connection to a corresponding type of telephone line. Wireless links may also be implemented. In any such implementation, communication interface 518 sends and receives electrical, electromagnetic, or optical signals that carry digital data streams representing various types of information.

Figure 6:
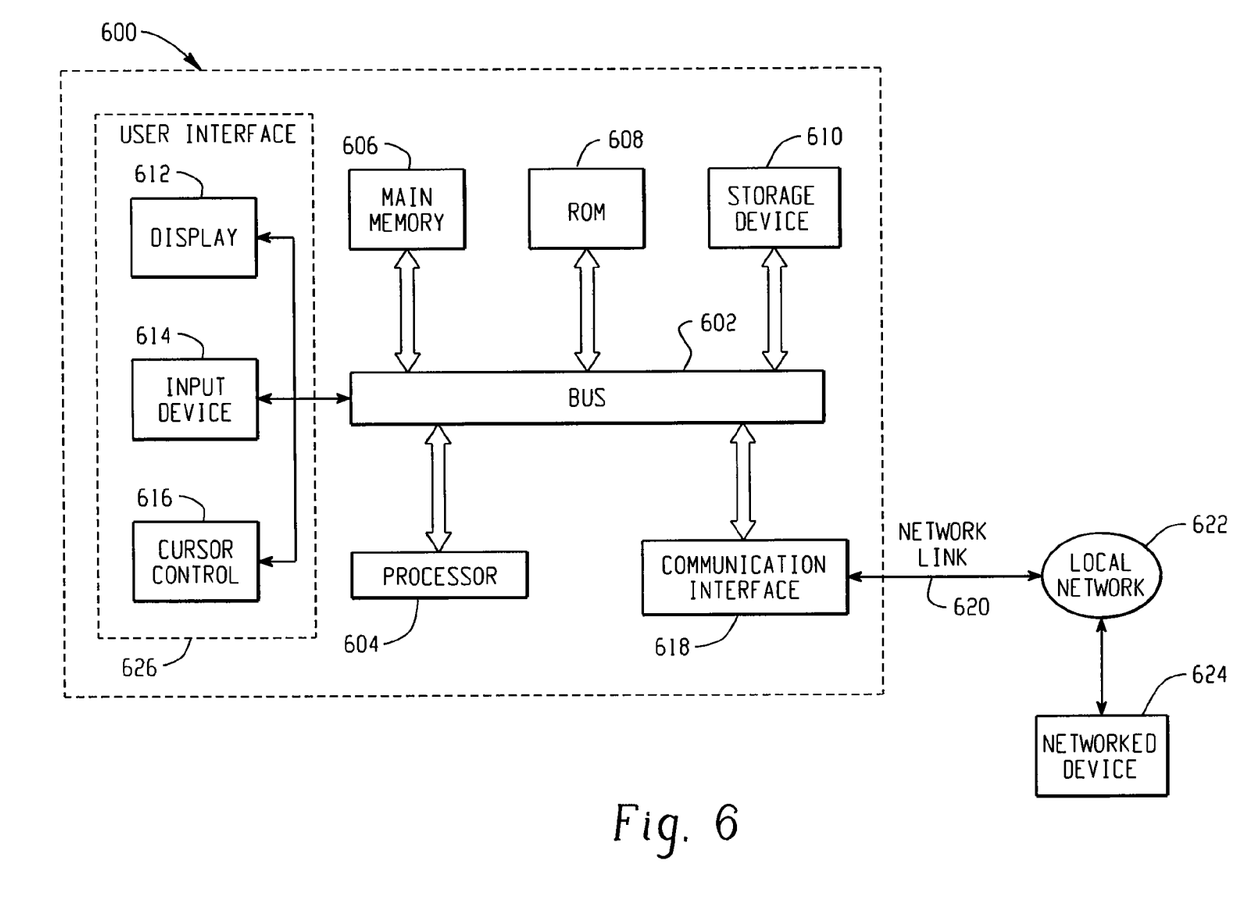
FIG. 6 is a block diagram of computer system for implementing a mobile user device upon which an example embodiment may be implemented.

FIG. 6 is a block diagram of computer system for implementing a mobile user device upon which an example embodiment may be implemented. For example, FIG. 6 is suitable for implementing wireless device 108 (FIG. 1).

Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, optical disk, and/or flash storage, is provided and coupled to bus 602 for storing information and instructions.

In an example embodiment, computer system 600 comprises a User Interface 626, For example, computer system 600 may be coupled via bus 602 to a display 612 such as liquid crystal display (LCD), for displaying information to a computer user. An input device 614, such as a keyboard including alphanumeric and other keys is coupled to bus 602 for communicating information and command selections to processor 604. Another type of user input device is cursor control 616, such as a mouse, a trackball, cursor direction keys, and/or a touchscreen for communicating direction information and command selections to processor 604 and for controlling cursor movement on display 612. This input device typically has two degrees of freedom in two axes, a first axis (e.g., x) and a second axis (e.g., y) that allows the device to specify positions in a plane. Display 612, input device 614 and cursor control 616 may suitably form a user interface 626.

Computer system 600 also includes a communication interface 618 coupled to bus 602. Communication interface 618 provides a two-way data communication coupling computer system 600 to a network link 620 that is connected to a local network 622 that allows computer system to communicate with a networked device 624. For example, communication interface 618 may be a local area network (LAN) card to provide a data communication connection to a compatible LAN. As another example, communication interface 618 may be an integrated services digital network (ISDN) card or a modem to provide a data communication connection to a corresponding type of telephone line. Wireless links may also be implemented. In any such implementation, communication interface 618 sends and receives electrical, electromagnetic, or optical signals that carry digital data streams representing various types of information.

Figure 7:
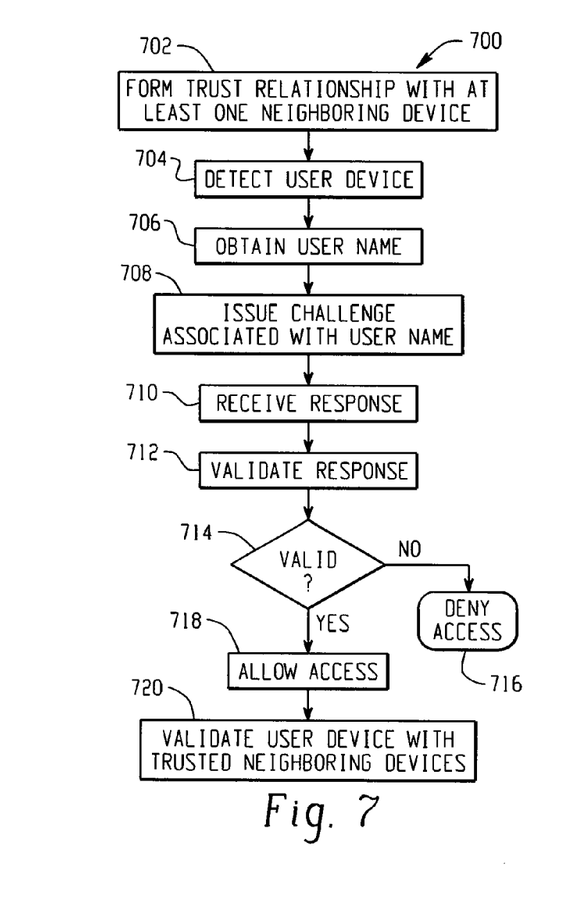
FIG. 7 is a block diagram of a methodology performed by a networked device for providing network mediated multi-device shared authentication.
Figure 8:
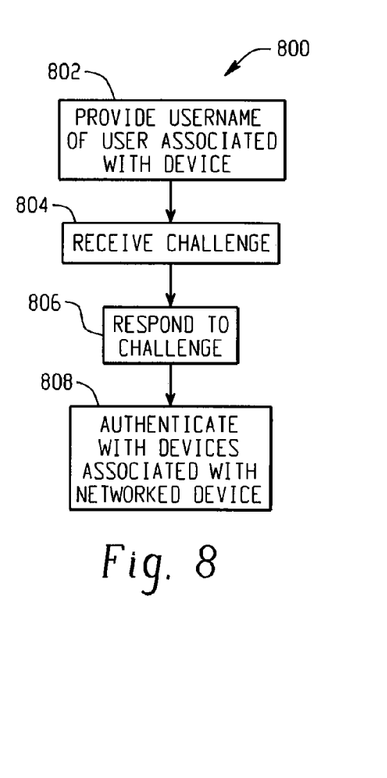
FIG. 8 is a block diagram of a methodology performed by a device associated with a user for implementing network mediated multi-device shared authentication.
Figure 9:
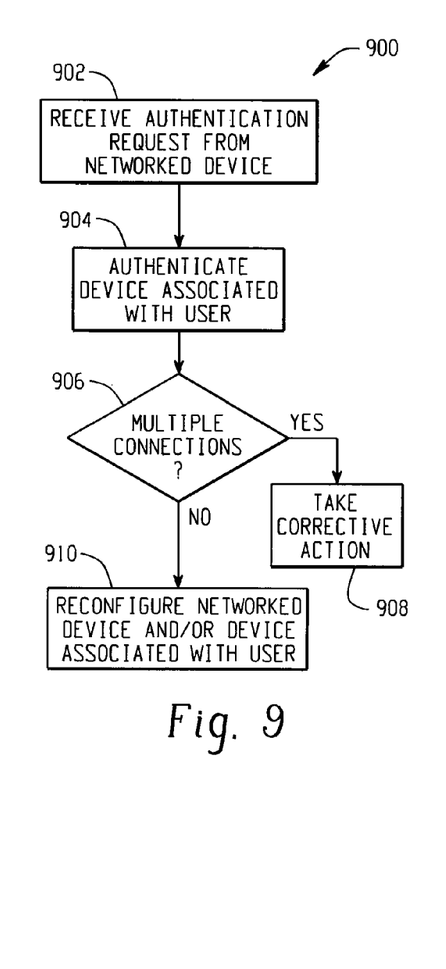
FIG. 9 is a block diagram of a methodology performed by an authentication server to perform for implementing network mediated multi-device shared authentication.

In view of the foregoing structural and functional features described above, methodologies in accordance with example embodiments will be better appreciated with reference to FIGS. 7-9. While, for purposes of simplicity of explanation, the methodologies of FIGS. 7-9 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required. The methodologies described herein are suitably adapted to be implemented in hardware, software, or a combination thereof.

FIG. 7 is a block diagram of a methodology 700 performed by a networked device for providing network mediated multi-device shared authentication. For example, methodology 700 may be performed by one or more of networked devices 102, 104 in FIG. 1), networked device 200 (FIG. 2), and/or computer system 500 (FIG. 5).

At 702, a trust relationship is established with one or more neighboring networked devices. In an example embodiment, the device may employ an authentication server to form the trust relationship. The trust relationship may be employed for forming a PAN or P2P network. For example, a computer at a workstation may form a trust relationship with a peripheral and/or a desktop telephone associated with the workstation. In a hotel room setting, a television may form a network with a desktop telephone and/or digital picture frame in a room.

At 704, a user device is detected. In an example embodiment, the user device is a wireless device, such as a smartphone, personal digital assistant, laptop computer, tablet computer, etc., associated with a user.

At 706, a username for a user associated with the user device is obtained. In an example embodiment, the username is broadcast by the user device. In another example embodiment, a request is sent to the user device for a username.

At 708, a challenge is sent to the user device. The challenge requests data associated with the user. For example, a password associated with the user may be requested. As another example, a challenge can be sent to the user device and the response is then entered into another device in the room. For example, a 5 digit secret code is sent to the user's device and the user then enters that code into the phone in the hotel room. This establishes that the user is in direct physical proximity to the room. At 710, a response to the challenge is received. The response may contain data associated with a user such as a password, an employee identification number, hotel room number, or other information specific to the user.

At 712, the response is verified. In an example embodiment, the response is forwarded to an authentication server for verification. In another embodiment, the response is verified against a username/password list.

At 714, a determination is made whether the response is valid. If the response is invalid (NO), at 716, access is denied. If, at 714, the response is determined to be valid (YES), at 718 access is allowed. In addition, at 720, the user associated with the user device and/or user device is validated with the one or more neighboring devices that have established trust relationships. In particular embodiments, validation of the user and/or user device is limited to neighboring devices within a predefined proximity and/or devices within a defined area, such as a room, workstation, building, etc.

FIG. 8 is a block diagram of a methodology 800 performed by a device associated with a user for implementing network mediated multi-device shared authentication. For example, methodology 800 may be performed by wireless device 108 (FIG. 1), mobile user device 300 (FIG. 3) and/or computer system 600 (FIG. 6).

At 802, a username of a user associated with the device is provided. This data may be broadcast or may be in response to a request received. In particular embodiments, the device provides a username to devices on a predefined list, ignoring requests from devices not on the predefined list.

At 804, a challenge is received. The challenge requests data to authenticate the user. In an example embodiment, the challenge is output on a user interface such as a display and/or a touchscreen.

At 806, a response to the challenge is sent to the device issuing the challenge. In an example embodiment, the response is received on a user interface such as a keyboard, mouse, and/or touchscreen. In an example embodiment, the response is sent encrypted by a key known to an authentication server, but not to the device issuing the challenge.

At 808, the user and/or device associated with the user is authenticated with devices associated with the networked device issuing the challenge. For example, a desktop computer with a wireless interface may issue the challenge, and upon authenticating the user, authenticate the user device with a neighboring device such as a projector allowing the device to send/receive data from the neighboring device. In another example embodiment, a neighboring device that cannot communicate with the device associated with the user may allow the user to utilize the device. In an example embodiment, access is granted to the neighboring devices for as long as either one of the neighboring devices and/or the device issuing the challenge can detect the device associated with the user.

FIG. 9 is a block diagram of a methodology 900 performed by an authentication server for implementing network mediated multi-device shared authentication. For example, methodology 900 may be implemented by authentication server 106 (FIG. 1), authentication server 400 (FIG. 4) and/or computer system 500 (FIG. 5).

At 902, a request to authenticate a user and/or a device associated with a user is received from a networked device. At 904, the user and/or device is authenticated. For example, a username, if not already provided, may be requested and a challenge may be issued. A response to the challenge (such as a password, key, credential or other predefined data) may be received for authenticating the user and/or device associated with the user.

At 906, a determination is made whether the user and/or device is being authenticated from multiple locations. If a determination is made that the user and/or device are being authenticated from multiple locations (YES), at 908 corrective action is taken. Corrective action may include but is not limited to locking out the user/device account, notifying a network administrator, and/or logging the incident.

If, at 906, the determination is made that the user and/or device associated with the user is only accessing the network from a single location (NO), access to the network is allowed. Optionally, at 910, either a networked device, device associated with a user, or both, are reconfigured. For example, a smartphone may be reconfigured to route all incoming/outgoing calls to a desktop telephone or a software telephone embodied on a desktop computer while the user is associated with the network within proximity of the current location. Voicemail and text messages may also be similarly rerouted.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a communication interface; and
authentication logic coupled with the communication interface;
wherein the authentication logic authenticates with a first neighboring device belonging to a set of neighboring devices thereby establishing a trust relationship between the apparatus and the set of neighboring devices;
wherein the authentication logic obtains via the communication interface data representative of a user associated with a user device;
wherein the authentication logic sends a challenge to the user device, via the communication interface, the challenge requesting data associated with the user associated with the user device;
wherein the authentication logic receives a response to the challenge via the communication interface;
wherein the response is selectively validated by an associated authentication server associated with the set of neighboring devices;
wherein the authentication logic selectively enables access by the user device to the apparatus in accordance with the authentication server selectively validating the response to the challenge; and
wherein the authentication logic selectively provides data to the first neighboring device in accordance with the authentication server selectively validating the response to the challenge, the data indicating that the user associated with the user device has been authenticated to enable access by the user associated with the user device to the set of neighboring devices.

2. The apparatus set forth in claim 1, wherein the authentication logic selectively authenticates with one or more neighboring devices within a predetermined proximity.

3. The apparatus set forth in claim 1, wherein the authentication logic selectively authenticates with one or more neighboring devices within a predefined bounded area.

4. The apparatus set forth in claim 1, wherein the data provided to the first neighboring device of the set of neighboring devices indicating that the user associated with the user device has been authenticated comprises a session key.

5. The apparatus set forth in claim 1, wherein the data provided to the first neighboring device of the set of neighboring devices indicating that the user associated with the user device has been authenticated comprises a telephone number associated with the user device.

6. The apparatus set forth in claim 1, wherein the data provided to the first neighboring device of the set of neighboring devices indicating that the user associated with the user device has been authenticated comprises a media access control (MAC) address associated with the user device.

7. The apparatus set forth in claim 1, wherein the authentication logic receives data representative of a second authenticated user from the first neighboring device belonging to the set of neighboring devices;
wherein the second authenticated user is allowed access to the apparatus based on the data representative of the second authenticated user received from the first neighboring device.

8. The apparatus set forth in claim 7, wherein the data representative of the second authenticated user comprises data representative of a user device associated with the second authenticated user; and
wherein the second authenticated user is allowed access to the apparatus while the user device associated with the second authenticated user is in communication with the communication interface.

9. An apparatus, comprising:
a communication interface;
authentication logic coupled with the communication interface; and
a user interface;
wherein the authentication logic provides a username of an associated user of the apparatus to a first neighboring networked device belonging to a set of at least two mutually authenticated neighboring devices;
wherein the authentication logic receives a challenge associated with the username;
wherein the authentication logic provides a response to the challenge;
wherein the challenge is provided to the user interface and the response to the challenge is received via the user interface;
wherein the response to the challenge is selectively validated by an authentication server associated with the set of at least two mutually authenticated neighboring devices;
wherein the authentication logic determines the user has been authenticated with the first neighboring networked device and at least one other networked device of the set of at least two mutually authenticated neighboring devices associated with the first neighboring networked device;
wherein the authentication logic determines other networked devices associated with the networked device requesting authentication;
wherein data representative of the other networked devices associated with the networked device requesting authentication is provided to the user interface;
wherein data representative of a user selection is received via the user interface indicating which of the other networked devices associated with the networked device are allowed to be authenticated; and
wherein the authentication logic limits authentication to devices that the data representative of a user selection indicates are allowed to be authenticated.

10. The apparatus set forth in claim 9, wherein the response is encrypted using an encryption key associated with an authentication server associated with the networked device.

11. The apparatus set forth in claim 9, wherein the authentication logic obtains a credential for accessing data from one of a group consisting of the networked device and at least one other networked device associated with the networked device.

12. A non-transitory computer-readable storage medium storing authentication logic, which, when executed by a processor on a networked computing device, performs operations to:
authenticate with a first neighboring device belonging to a set of neighboring devices thereby establishing a trust relationship between the networked computing device and the set of neighboring devices;

obtain via the communication interface data representative of a user associated with a user device;

send a challenge to the user device, via the communication interface, the challenge requesting data associated with the user associated with the user device;

receive a response to the challenge via the communication interface, wherein the response is selectively validated by an associated authentication server associated with the set of neighboring devices;

enable access by the user device to the networked computing device in accordance with the authentication server selectively validating the response to the challenge; and selectively provide data to the first neighboring device in accordance with the authentication server selectively validating the response to the challenge, the data indicating that the user associated with the user device has been authenticated to enable access by the user associated with the user device to the set of neighboring devices.

13. The computer-readable storage medium of claim 12, wherein the data provided to the first neighboring device of the set of neighboring devices indicating that the user associated with the user device has been authenticated comprises a session key.

14. The computer-readable storage medium of claim 13, wherein the authentication logic receives data representative of a second authenticated user from the first neighboring device belonging to the set of neighboring devices;

wherein the second authenticated user is allowed access to the apparatus based on the data representative of the second authenticated user received from the first neighboring device.

15. A method, comprising:

authenticating, by a processor executing authentication logic on a networked computing device, with a first neighboring device belonging to a set of neighboring devices thereby establishing a trust relationship between the networked computing device and the set of neighboring devices;

obtaining via a communication interface data representative of a user associated with a user device;

sending a challenge to the user device, via the communication interface, the challenge requesting data associated with the user associated with the user device;

receiving a response to the challenge via the communication interface, wherein the response is selectively validated by an associated authentication server associated with the set of neighboring devices;

enabling access by the user device to the networked computing device in accordance with the authentication server selectively validating the response to the challenge; and selectively providing data to the first neighboring device in accordance with the authentication server selectively validating the response to the challenge, the data indicating that the user associated with the user device has been authenticated to enable access by the user associated with the user device to the set of neighboring devices.

16. The method of claim 15, wherein the data provided to the first neighboring device of the set of neighboring devices indicating that the user associated with the user device has been authenticated comprises a session key.

* * * * *

UNITED STATES PATENT AND TRADEMARK OFFICE
CERTIFICATE OF CORRECTION

| | | |
|---|---|---|
| PATENT NO. | : 9,172,546 B2 | Page 1 of 1 |
| APPLICATION NO. | : 13/358079 | |
| DATED | : October 27, 2015 | |
| INVENTOR(S) | : Friedl et al. | |

It is certified that error appears in the above-identified patent and that said Letters Patent is hereby corrected as shown below:

In the Claims:
Column 17, Claim 14, Line 26, please delete "13" and insert --12-- therefor.

Signed and Sealed this
Twelfth Day of April, 2016

Michelle K. Lee
*Director of the United States Patent and Trademark Office*